United States Patent
Cavanna

(10) Patent No.: US 7,908,470 B1
(45) Date of Patent: Mar. 15, 2011

(54) MULTI-PROCESSOR COMPUTER WITH PLURAL BOOT MEMORIES

(75) Inventor: Vincent E. Cavanna, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 646 days.

(21) Appl. No.: 11/590,080

(22) Filed: Oct. 31, 2006

(51) Int. Cl.
*G06F 9/00* (2006.01)
*G06F 15/177* (2006.01)

(52) U.S. Cl. ............... 713/2; 713/1; 717/166; 717/169; 711/1; 711/100; 711/168

(58) Field of Classification Search ............... 713/1, 2; 717/168, 169; 711/1, 100, 168
See application file for complete search history.

(56) References Cited

U.S. PATENT DOCUMENTS

| | | | |
|---|---|---|---|
| 5,819,087 A | | 10/1998 | Le et al. |
| 5,938,765 A | * | 8/1999 | Dove et al. ................. 713/1 |
| 6,012,142 A | * | 1/2000 | Dokic et al. ................ 713/2 |
| 6,154,838 A | | 11/2000 | Le et al. |
| 6,360,303 B1 | * | 3/2002 | Wisler et al. ............... 711/152 |
| 6,421,792 B1 | * | 7/2002 | Cromer et al. ............... 714/36 |
| 6,701,429 B1 | * | 3/2004 | Gustafsson et al. .......... 713/1 |
| 7,000,101 B2 | * | 2/2006 | Wu et al. ...................... 713/1 |
| 7,024,551 B2 | * | 4/2006 | King et al. ................... 713/2 |
| 7,032,106 B2 | * | 4/2006 | Horanzy et al. ............. 713/2 |
| 7,065,599 B2 | * | 6/2006 | King et al. ................ 710/301 |
| 7,100,069 B1 | | 8/2006 | Hickman et al. |
| 7,281,127 B2 | * | 10/2007 | Rothman et al. ............. 713/2 |
| 7,363,434 B2 | * | 4/2008 | Polyudov .................. 711/147 |
| 7,577,832 B2 | * | 8/2009 | Wisecup et al. ............. 713/2 |
| 7,814,479 B2 | * | 10/2010 | Douglas et al. ............ 717/173 |
| 2003/0101304 A1 | * | 5/2003 | King et al. ................ 710/301 |
| 2003/0126242 A1 | * | 7/2003 | Chang ..................... 709/222 |
| 2004/0090827 A1 | * | 5/2004 | Dahlen et al. ............. 365/200 |
| 2004/0107323 A1 | * | 6/2004 | Matsuura et al. ........... 711/150 |
| 2004/0133771 A1 | * | 7/2004 | King et al. ............... 713/100 |
| 2005/0223210 A1 | * | 10/2005 | Sasaki et al. ............... 713/2 |
| 2006/0047943 A1 | * | 3/2006 | Kelly ........................ 713/2 |
| 2006/0085564 A1 | * | 4/2006 | Bomhoff et al. ............. 710/8 |
| 2006/0136703 A1 | * | 6/2006 | Wisecup et al. ............. 713/2 |
| 2006/0149959 A1 | * | 7/2006 | Rothman et al. ............. 713/2 |
| 2007/0067614 A1 | * | 3/2007 | Berry et al. ................ 713/1 |
| 2007/0174601 A1 | * | 7/2007 | Douglas et al. ............. 713/1 |
| 2007/0186086 A1 | * | 8/2007 | Lambert et al. ............. 713/1 |
| 2007/0250659 A1 | * | 10/2007 | Booth et al. .............. 711/103 |
| 2008/0052699 A1 | * | 2/2008 | Baker et al. .............. 717/168 |
| 2008/0082814 A1 | * | 4/2008 | Kuo et al. .................. 713/2 |

* cited by examiner

Primary Examiner — Thomas Lee
Assistant Examiner — Jaweed A Abbaszadeh

(57) ABSTRACT

The present invention provides a controller that allows plural processor nodes to access plural boot memories concurrently.

13 Claims, 1 Drawing Sheet

MULTI-PROCESSOR COMPUTER WITH PLURAL BOOT MEMORIES

BACKGROUND OF THE INVENTION

Herein, related art may be discussed to put the invention in context. Related art labeled "prior art" is admitted prior art; related art not labeled "prior art" is not admitted prior art.

Computer systems typically store boot firmware in non-volatile memory, such as read-only memory (ROM) or flash memory, that is addressed by default when a computer is turned on. This boot firmware contains initialization routines and points to locations whence an operating system can be launched to a user-friendly state.

A multiprocessor boot procedure involves copying a boot "image" from relatively slow non-volatile boot memory to relatively fast rewritable, random-access memory (RAM). In a typical multiprocessor system, the boot process has two phases. In the first phase, each processor must access the boot memory in turn to establish its state to cooperate with the other processors and to select a "monarch" processor. In the second phase, the monarch copies the boot image into RAM while the other processors, "serfs", sleep. After preparing the RAM for multi-processor use, the monarch awakens each serf and the multiprocessor computer system runs from RAM. Thus, each processor in a multiprocessor computer boots using identical boot firmware.

When a "crash", a specific class of system error, occurs, the boot image in RAM is sometimes corrupted and therefore cannot be trusted. Accordingly, in response to a crash, all processors recopy boot images from non-volatile boot memory to ensure their error handling and recovery instructions are from identical and trusted boot images.

Booting and error handling, or any boot ROM access, especially in a multiprocessor system, is quite time consuming. The present invention addresses the problem of reducing the time for a multiprocessor system to finish all processor accesses to an identical boot ROM image. Other problems addressed by the invention are apparent from the description below.

BRIEF DESCRIPTION OF THE DRAWING

The following drawing is of an embodiment of the invention and not of the invention itself.

DETAILED DESCRIPTION

Figure 1:
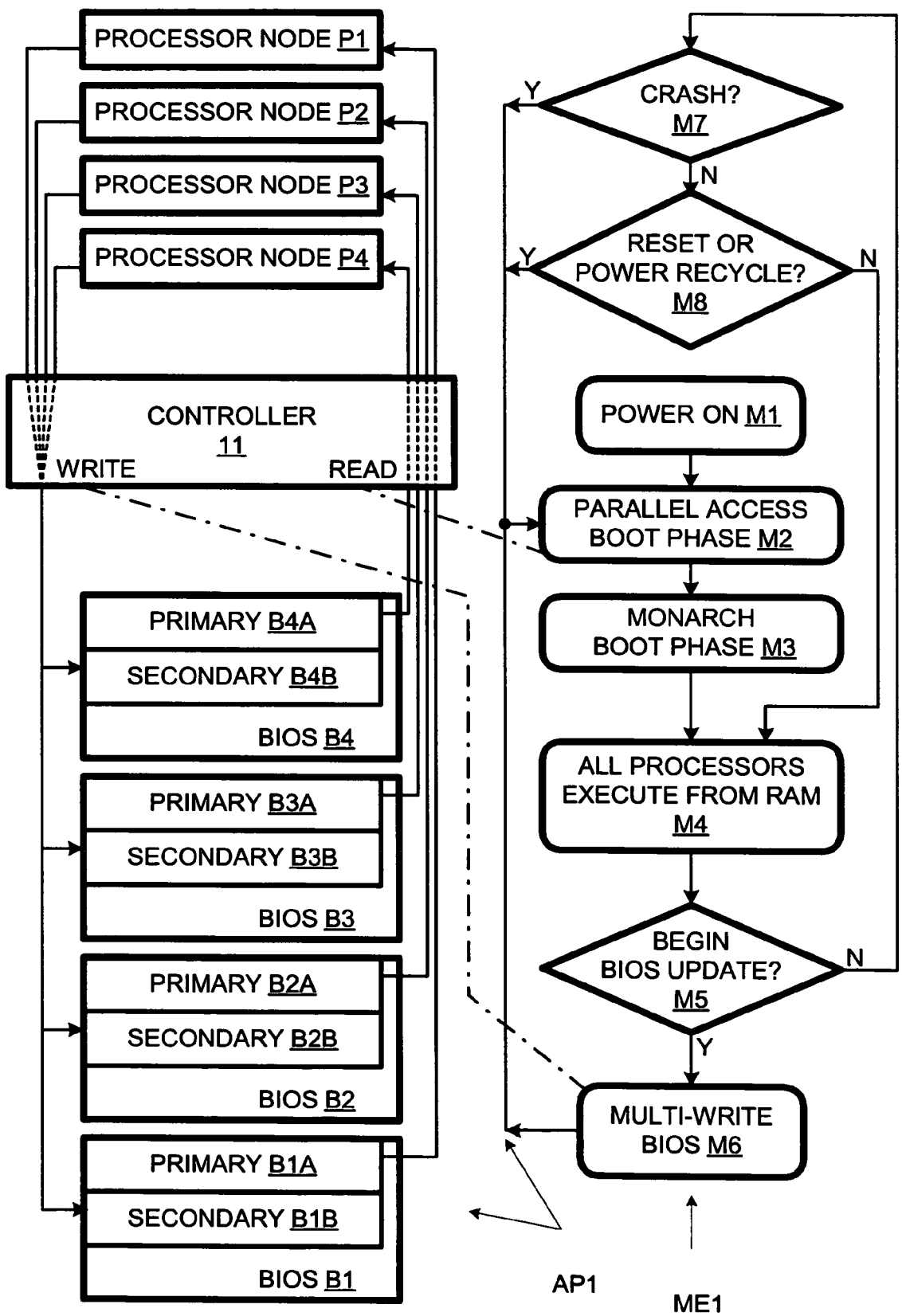
FIG. 1 is a combination block diagram and flow chart of a computer and a method in accordance with embodiments of the invention.

The present invention provides for reduced boot times and error recovery times, for a multiprocessor computer, by reducing the time it takes to make transfer multiple copies of a boot image into RAM during the first boot phase. Instead of having processors take turns accessing a single boot image, the present invention provides for multiple boot images that can be accessed concurrently. Thus, multiple RAM accesses can be effected in the time it takes to for a single access.

As shown in FIG. 1, a computer AP1 comprises processor nodes P1-P4, and a boot subsystem including a boot memory controller and boot memories B1-B4. Each processor node P1-P4 includes one processor. In alternative embodiments, a processor node can contain plural processors that obtain their copies of the boot image from the same boot memory.

Boot controller 11 coordinates processor node accesses to the boot memories. Each boot memory B1-B4 contains of a pair of firmware images, a primary image B1A-B4A and a secondary image B1B-B4B. In the illustrated embodiment, each boot memory is a separate integrated circuit. In an alternative embodiment, each boot memory has two integrated circuits, one for the primary image and one for the secondary image. In another alternative embodiment, two or more boot memories are located on the same integrated circuit. The processors boot from the primary image and they are allowed to update the secondary image with a new firmware version. On the boot attempt following a successful update, the former secondary image becomes primary, and the former primary image becomes the secondary.

Boot memories B1-B4 are pairs of flash memories that store the boot code images for computer AP1. Alternatively, the boot image can be in ROM, but the boot code in flash memory can be updated without exchanging physical parts. Controller 11 allows reads from the primary images in B1-B4. Controller 11 writes updated images to the secondary memories in B1-B4, simultaneously.

Computer AP1 supports the following method ME1. At method segment M1, power is supplied to computer AP1. In a first "parallel boot" phase at method segment M2, all processors in nodes P1-P4 use controller 11 to simultaneously read from respective boot memories B1-B4 to put computer AP1 in a state where all of the processors can cooperate with each other and execute code that was copied into RAM. During this phase, the processors collectively select one of their own to serve as "monarch". During second-boot-phase method segment M3, the monarch processor copies the boot image to RAM, and it prepares the other devices in the system for multiprocessor cooperation. In the meantime, other processors, serfs, execute initialization code and then put themselves to sleep until the monarch finishes computer initialization. At method segment M4, the processors of nodes P1-P4 cooperatively execute code from RAM. Once processor nodes P1-P4 are executing from RAM, they load and run a multiprocessor operating system. Alternatively, different operating systems can be run on different processors.

Method segments M5, M7, and M8 represent the reaction of computer AP1 to various conditions that require boot memory access in addition to the standard boot process. Method segment M5 occurs when the one of the processors in the computer is commanded to update the secondary boot image. All secondary images in B1-B4 are updated with the same firmware image for use on the next boot attempt. This is accomplished at "multi-write" BIOS method segment M6 by writing the updated firmware image thru controller 11. Controller 11 converts the write commands from the processor into simultaneous write commands to all secondary boot memories inside boot memories B1-B4. Controller 11 forces all of the boot memories B1-B4 to have identical new secondary images, and thus identical primary images when the secondary images become primary.

Method segment M7 addresses the unfortunate case of computer crashing or detecting some catastrophic failure that eliminates trust in the integrity of the code in the RAM. In response, processor nodes P1-P4 execute error handling and/or recovery code from boot memories B1-B4 respectively. Controller 11 allows processor nodes P1-P4 to simultaneously access the error handler code, thereby reducing error recovery code execution time by a factor equal to the number of concurrent accesses to the boot images. Method segment M8 is the result of a reset or power cycle. The result is a two-phase reboot sequence initiation essentially identical to the sequence of segments M2 and M3.

The invention has particularly applicability to servers that have multiple processors or threads reading boot code (firmware) or error handling code from a single flash memory device at a single address location. The memory device is interfaced to by a field-programmable gate array (FPGA) (or other chip/controller) to multiple ports that access the memory devices—it makes the processors see a single firmware image which can be read independently and read from different address locations at the same time.

The flash memory devices can respond to "write transactions" at the same address space (as a result of the FPGA). Whenever a write is sent to this address space, all memory devices will accept it. "Read transactions" to this address space are mapped to a flash device which is specific to the read port on the FPGA that the reading processor node is connected to. This allows the identical code to be read by multiple processors (from different physical devices) independently and concurrently.

An address space aliases all write ports on the flash memory devices. The result of this aliasing is that the contents of the flash memory devices are always the same. This avoids any issues of out-of-synch (un-identical) firmware images. The read ports that individually (non-aliased) reference the flash devices' read ports provide a means for multiple, separate, controller channels to read from the flash devices, and they can read different locations in order to provide the data to the requesting CPU in a shorter time. The ability to provide the data back to the CPUs decreases the time required to boot a matching with multiple CPUs or threads (as well as decreasing the amount of time needed to run error recovery or data collection code from the memory device(s)).

The fact that the read ports are not aliased, and are independently, and concurrently, accessible, means that multiple entities can read the code from the memory without waiting for many other entities to finish their reads. This shortens the time each entity needs to wait to finish all of its read operations. The fact that the write ports are aliased means that the images never lose synchronization with each other; they are always the same with no extra work for the programming entity to verify this.

This solution is scaleable so architectures that use two or more entities to read from boot/error memory address space can implement this in order to keep boot time low as the number of entities grows in a system. Lower latency is apparent when multiple entities read from memory that's presented on multiple read ports. This translates into the shorter boot times and error recovery times. Natural synchronization between the different physical memory devices since writes are sent to all of them at one time (via the address aliasing on the write ports). The scaleable nature of this solution allows the latency to remain low as the number of entities doing reads increases with product complexity/maturity.

The present invention applies to multiprocessor systems. Where each processor node includes a single processor, the number of physical boot memory devices is sufficient that each processor has access to its own device. However, the invention also provides for nodes with more than one processor. In such cases, the node can acquire a copy of the boot image to share among its processors, or each processor may be required to access the node's boot ROM in sequence. For example, four boot memory pairs of primary/secondary images can be used in an eight-processor system so that two processors use each boot memory. This is still a considerable savings over one boot memory having to serve eight processors in succession. These and other variations upon and modifications to the illustrated embodiments are provided for by the present invention, the scope of which is defined by the following claims.

What is claimed is:

1. A multi-processor computer comprising:
plural processor nodes;
plural non-volatile boot source memories each of which stores a respective copy of a boot routine; and
a controller communicatively coupled to said processor nodes and to said boot source memories so that plural of said processor nodes can access respective ones of said boot source memories concurrently to read respective copies of said boot routine and so that one of said processor nodes can update all of said non-volatile boot source memories concurrently.

2. A computer as recited in claim 1 wherein each of said boot source memories concurrently stores a primary boot image and a secondary boot image.

3. A computer as recited in claim 2 wherein all of said boot source memories respond to write transactions at the same address space so that when one of said processor nodes writes to said boot source memories to update a secondary image, the secondary images in all of said boot source memories are updated concurrently.

4. A computer as recited in claim 2 wherein, when one of said processor nodes writes to said boot source memories to update a secondary image, said controller causes all of said secondary images to be updated concurrently.

5. A computer as recited in claim 1 wherein the number of processor nodes equals the number of boot source memories.

6. A method for booting a multi-processor computer, said method comprising:
having plural processor nodes access respective non-volatile boot source memories via a controller to retrieve respective but identical boot images;
loading and running at least one operating system on said processor nodes; and
having one of said processor nodes write to all of said non-volatile boot source memories via said controller.

7. A method as recited in claim 6 wherein each of said boot source memories concurrently include a primary boot image and a secondary boot image, said access involving retrieving the primary boot images.

8. A method as recited in claim 7 further comprising said controller converting a write command from one of said processor nodes into plural write commands so as to concurrently update plural secondary images.

9. A method as recited in claim 8 wherein said update involves writing update data to a single write address space to which all of said boot source memories respond.

10. A method as recited in claim 8 wherein said update involves distributing an update concurrently to the different boot source memories at different addresses.

11. A method as recited in claim 7 wherein a processor node boots from its respective primary boot image and not from its respective secondary boot image so that said secondary boot image can be updated.

12. A method as recited in claim 11 further comprising booting said processor nodes after said update so that each updated secondary image becomes a primary image and each said primary image becomes a secondary image.

13. A computer as recited in claim 2 wherein a primary image is an image from which a respective processor node boots and a secondary image is an image from which a respective processor node does not boot so that the secondary image can be updated.

* * * * *